UNITED STATES PATENT OFFICE.

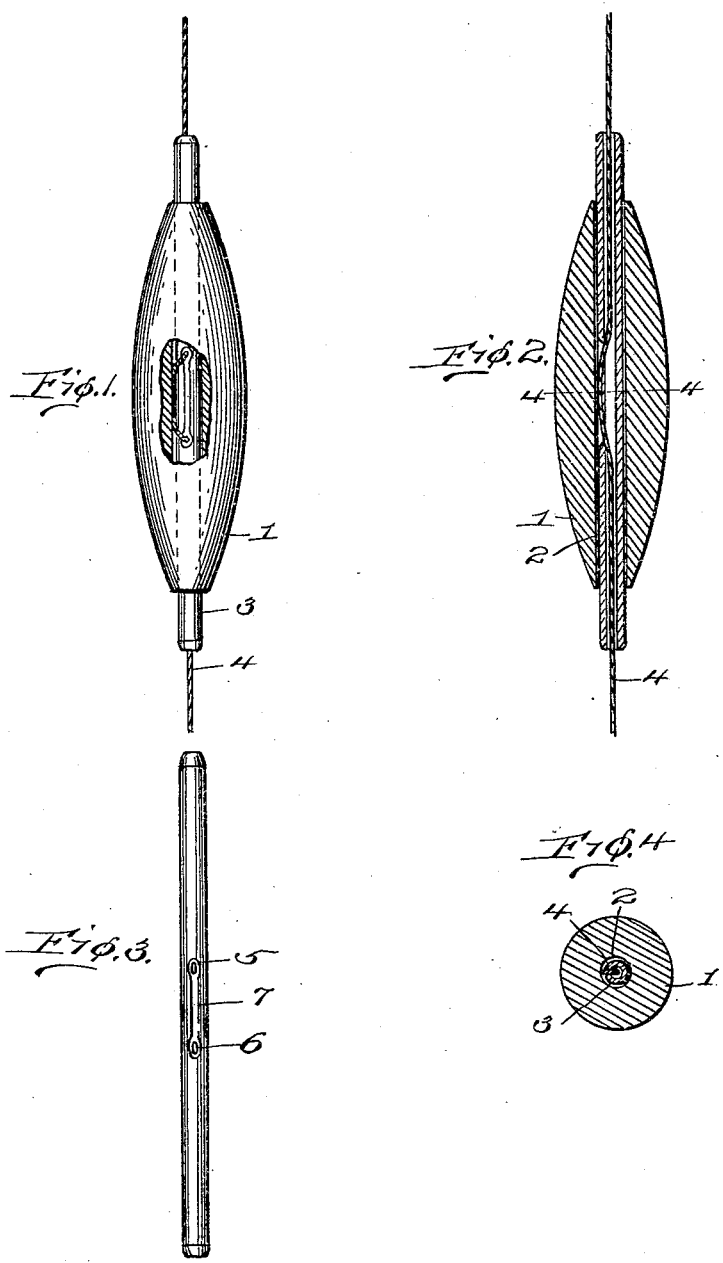

GEORGE BLANK, OF BURLINGTON, IOWA.

FLOAT.

958,581.  Specification of Letters Patent.  Patented May 17, 1910.

Application filed April 21, 1909. Serial No. 491,291.

*To all whom it may concern:*

Be it known that I, GEORGE BLANK, a citizen of the United States, residing at Burlington, in the county of Des Moines and State of Iowa, have invented certain new and useful Improvements in Floats; and I do hereby declare the following to be a full, clear, and exact description of the invention, such as will enable others skilled in the art to which it appertains to make and use the same.

This invention relates to improvements in floats or fishing bobbers, and particularly to means for clamping the float to a fishing line at any desired point, and has for an object an improved arrangement of means for clamping the cord interiorly of the bob for preventing any movement of the latter.

Another object in view is the arrangement of a pin having a plurality of holes or apertures therein fitted into a bob and arranged with a fishing line passing therethrough and through said holes, whereby the line is brought in contact with the bob so that upon the rotation of the pin the cord will become tangled and pinched or clamped against the bob for preventing any further longitudinal movement of the bob along the line.

With these and other objects in view the invention comprises certain novel constructions, combinations and arrangement of parts as will be hereinafter more fully described and claimed.

In the accompanying drawings: Figure 1 is a side elevation of an embodiment of the invention, certain parts being broken away to better disclose the invention. Fig. 2 is a longitudinal vertical section through the structure shown in Fig. 1. Fig. 3 is a view of a locking pin embodying certain features of the invention. Fig. 4 is a section through Fig. 2, approximately on line 4—4.

In constructing a bobber or float embodying the invention the float proper may be made from any kind of material, as wood or cork, and decorated in any desired manner. The float is formed with a passage way extending longitudinally therethrough for receiving a hollow tube or pin of any desired material, as wood or bamboo, which fits snugly but not tightly the passage way in the float proper. The pin is arranged with a plurality of apertures therein through which the cord or line is passed so that when the pin is placed within the passage way of the float and turned the cord will be caught and pinched against the sides of the pin and against the interior walls of the passage way of the float. This will lock the pin in position and also lock the cord or line against movement, or more strictly speaking, lock the float against movement on the cord or line.

In order that the invention may be more clearly understood an embodiment is shown in the accompanying drawings, in which 1 indicates a float of cork, wood, or any other desired material. The float 1 is formed with a passage way 2 extending longitudinally therethrough into which is fitted the pin or tube 3 that is adapted to carry the line or cord 4. The pin 3 is provided with apertures 5 and 6 and with a beveled and reduced portion 7 between the apertures. In assembling the pin and float the cord 4 is passed through the pin and through apertures 5 and 6 so as to have the cord raised upon the flattened or reduced portion 7 which is exteriorly of the pin 3. After the cord 4 has been placed in pin 3 the same is inserted into float 1 as shown in Fig. 2. After the float, together with its pin has been moved to the desired place on line or cord 4 pin 3 is turned to any desired extent for tangling and pinching cord 4 between pin 3 and the walls of passage way 2. This will prevent any further movement of the float or pin along the line. When it is desired to readjust the float pin 3 is turned in a reverse direction and the line pulled through the pin until the float has been properly adjusted.

What I claim is:

A fishing bob embodying a buoyant body provided with a longitudinal aperture, a tube rotatably mounted in the aperture and formed with a plurality of spaced apertures connected by a channel, a line passing through the tube and being threaded through the apertures and engaging the channel, the tube being adapted to be rotated to clamp the line against the wall of the aperture.

In testimony whereof I affix my signature in presence of two witnesses.

GEORGE BLANK.

Witnesses:
  ALBERT L. BIKLEN,
  GEORGE E. HILL.